US009462594B2

(12) United States Patent
Ji et al.

(10) Patent No.: US 9,462,594 B2
(45) Date of Patent: Oct. 4, 2016

(54) MIMO TRANSMISSION METHOD AND APPARATUS FOR USE IN WIRELESS COMMUNICATION SYSTEM

(71) Applicant: Samsung Electronics Co., Ltd, Gyeonggi-do (KR)

(72) Inventors: Hyoungju Ji, Seoul (KR); Younsun Kim, Gyeonggi-do (KR); Juho Lee, Gyeonggi-do (KR); Hyojin Lee, Gyeonggi-do (KR); Joonyoung Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 141 days.

(21) Appl. No.: 14/092,706

(22) Filed: Nov. 27, 2013

(65) Prior Publication Data
US 2014/0146765 A1    May 29, 2014

(30) Foreign Application Priority Data
Nov. 27, 2012    (KR) .......................... 10-2012-0135466

(51) Int. Cl.
| | |
|---|---|
| *H04W 72/08* | (2009.01) |
| *H04W 72/04* | (2009.01) |
| *H04J 11/00* | (2006.01) |
| *H04B 7/04* | (2006.01) |
| *H04B 7/06* | (2006.01) |

(52) U.S. Cl.
CPC .......... *H04W 72/082* (2013.01); *H04J 11/004* (2013.01); *H04W 72/0406* (2013.01); *H04B 7/0452* (2013.01); *H04B 7/0617* (2013.01)

(58) Field of Classification Search
None
See application file for complete search history.

(56) References Cited

U.S. PATENT DOCUMENTS

| | | | |
|---|---|---|---|
| 2009/0016263 A1 | 1/2009 | Kishigami et al. | |
| 2009/0227263 A1* | 9/2009 | Agrawal | H04W 16/16 455/452.1 |
| 2010/0285810 A1* | 11/2010 | Ko et al. | 455/450 |

(Continued)

FOREIGN PATENT DOCUMENTS

| | | |
|---|---|---|
| EP | 1 793 507 A1 | 6/2007 |
| KR | 10-2011-0021697 | 3/2011 |

(Continued)

OTHER PUBLICATIONS

International Search Report dated Feb. 20, 2014 in connection with International Patent Application No. PCT/KR2013/010858, 3 pages.

(Continued)

*Primary Examiner* — Diane Lo

(57) ABSTRACT

A method for canceling interference between multiple terminals scheduled on the same time/frequency resource for communication between a terminal and a base station using a plurality of antennas. The interference cancellation method includes receiving, at a terminal, control channel information from a base station, determining other base station information and other terminal information based on the received control channel information, receiving a data channel from the base station, and cancelling interference to the data channel based on the other base station information and other terminal information. The terminal is capable of mitigating interference caused by the signals transmitted to other terminals using the least information even with legacy terminal receivers having no interference cancellation capability.

16 Claims, 14 Drawing Sheets

(56) References Cited

U.S. PATENT DOCUMENTS

| | | |
|---|---|---|
| 2010/0291936 A1 | 11/2010 | Zangi et al. |
| 2010/0309861 A1 | 12/2010 | Gorokhov et al. |
| 2011/0044269 A1 | 2/2011 | Fan et al. |
| 2011/0075753 A1 | 3/2011 | Jung et al. |
| 2012/0134338 A1 | 5/2012 | Ko et al. |
| 2013/0094547 A1 | 4/2013 | Kang et al. |
| 2013/0196700 A1* | 8/2013 | Tiirola ............... H04J 11/0043 455/501 |
| 2014/0153499 A1* | 6/2014 | Wang et al. ............ 370/329 |
| 2014/0293948 A1* | 10/2014 | Jiang ............... 370/329 |

FOREIGN PATENT DOCUMENTS

| | | |
|---|---|---|
| KR | 10-2011-0136705 A | 12/2011 |
| KR | 10-2012-0053023 A | 5/2012 |

OTHER PUBLICATIONS

Extended European Search Report dated Jun. 24, 2016 in connection with European Application No. 13859240.7, 5 pages.

* cited by examiner

MIMO TRANSMISSION METHOD AND APPARATUS FOR USE IN WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean Patent Application filed on Nov. 27, 2012 in the Korean Intellectual Property Office and assigned Serial No. 10-2012-0135466, the entire disclosure of which is hereby incorporated by reference.

TECHNICAL FIELD

The present disclosure relates to a Multiple Input Multiple Output (MIMO) transmission method and apparatus and, in particular, to a method for canceling interference between multiple terminals scheduled on the same time/frequency resource for communication between a terminal and a base station using a plurality of antennas. Furthermore, the present disclosure relates to a channel measurement reference signal allocation method, control channel design method, and data channel transmission method for efficient interference cancellation.

BACKGROUND

Mobile communication systems have been developed for the user to communicate on the move. With the rapid advance of technologies, mobile communication systems have evolved to the level capable of providing high speed data communication service as well as voice telephony service.

Recently, as one of the next generation mobile communication systems, Long Term Evolution (LTE) is on the standardization by the $3^{rd}$ Generation Partnership Project (3GPP). LTE is a technology designed to provide high speed packet-based communication of up to 100 Mbps. With the completion of LTE standardization, recent studies are focused on LTE-Advanced (LTE-A) for improving data rate with the adoption of several new techniques to legacy LTE systems. The term 'LTE system' as used herein may be construed to include legacy LTE systems and LTE-A systems.

SUMMARY

To address the above-discussed deficiencies, it is a primary object to provide a method for canceling interference between multiple terminals scheduled on the same time/frequency resource for communication between a terminal and a base station using a plurality of antennas.

In the case that a base station with multiple antennas communicates with one communication terminal, the base station is capable of transmitting data to the terminal using the channel characteristics of the multiple antennas so-called spatial multiplexing (SM). The base station is capable of transmitting data to a plurality of spatially distant terminals on the same time-frequency resource using multiple antennas and this is referred to as Spatially Diversity Multiple Access (SDMA). In the case of using this technology, the terminals receive different signals on the same time-frequency resource, resulting in improvement of system throughput. However, interference may occur between signals transmitted to multiple terminals especially when the terminals using the same resource are not far enough from each other and the spatial correlation degree is high. In this case, if the terminal knows the information on the interference signal, it is possible to cancel the higher interference signal. In order to accomplish this, it is necessary to acquire a large amount of information on the data transmitted to other terminals and the signaling overhead for exchanging such control information may cause degradation of system throughput.

In accordance with an aspect of the present disclosure, an interference cancellation method of a terminal in a mobile communication system is provided. The interference cancellation method includes receiving control channel information from a base station, determining other base station information and other terminal information based on the received control channel information, receiving a data channel from the base station, and cancelling interference to the data channel based on the other base station information and the other terminal information.

In accordance with another aspect of the present disclosure, an interference cancellation support method of a base station in a mobile communication system is provided. The interference cancellation support method includes transmitting to a terminal control channel information including other base station information and other terminal information and transmitting a data channel to the terminal, wherein the terminal acquires other base station and terminal information from the received control channel information and cancels interference to the data channel based on the other base station and terminal information.

In accordance with another aspect of the present disclosure, a terminal of a mobile communication system is provided. The terminal includes a transceiver configured to transmit to and receive from a base station, and a controller configured to control the transceiver to receive control channel information from a base station, determine other base station information and other terminal information based on the received control channel information, control the transceiver to receive a data channel from the base station, and cancel interference to the data channel based on the other base station and the other terminal information.

In accordance with still another aspect of the present disclosure, a base station of a mobile communication system is provided. The base station includes a transceiver configured to transmit and receive signals to and from a terminal and a controller configured to control the transceiver to transmit to the terminal control channel information including other base station information and other terminal information and a data channel, wherein the terminal acquires other base station and terminal information from the received control channel information and cancels interference to the data channel based on the other base station and terminal information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
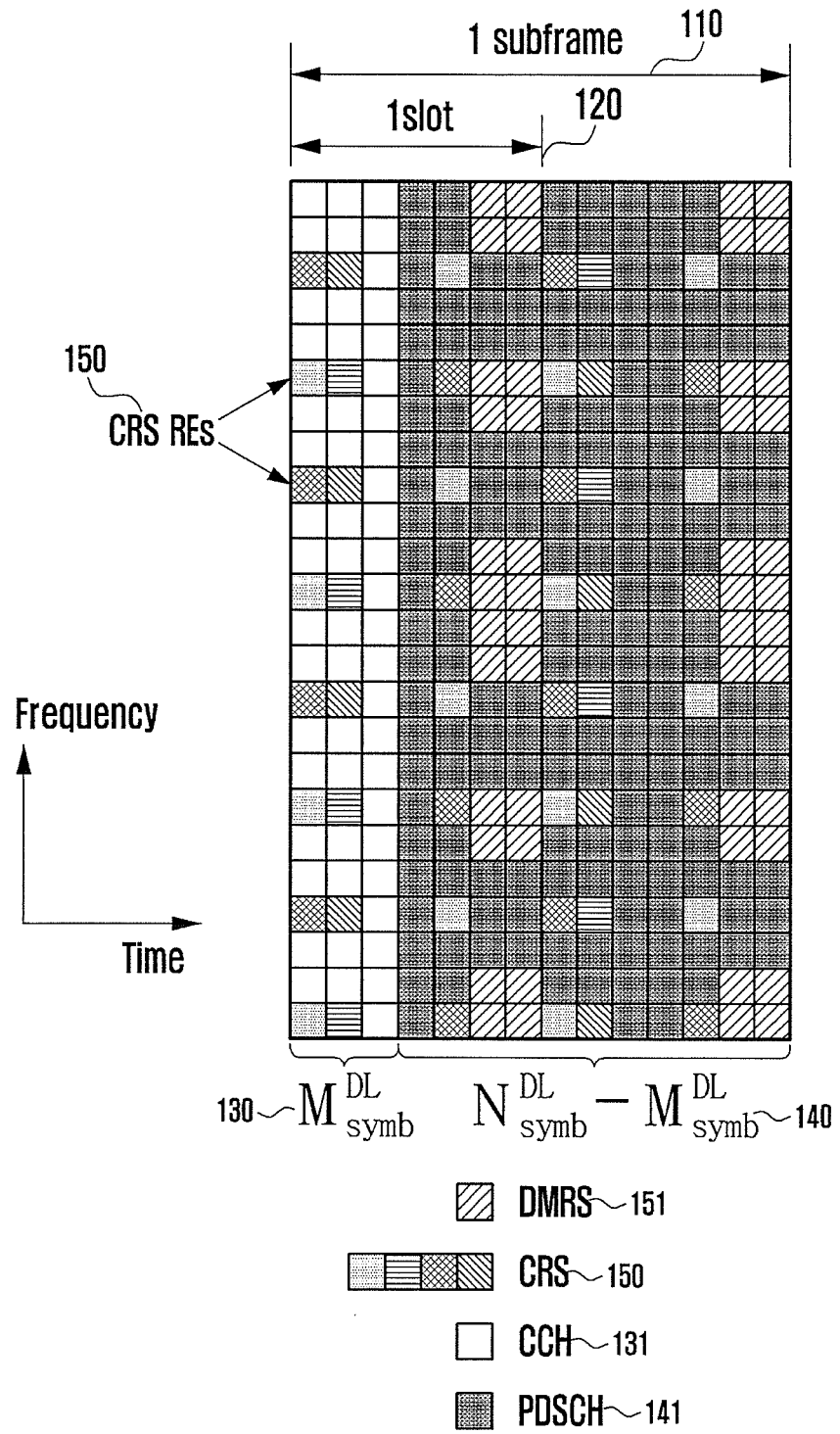
FIG. 1 is a diagram illustrating a structure of a subframe for use in the system to which the present disclosure is applied.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Exemplary embodiments of the present disclosure are described with reference to the accompanying drawings in detail. Detailed description of well-known functions and structures incorporated herein may be omitted to avoid obscuring the subject matter of the present disclosure. This aims to omit unnecessary description so as to make the subject matter of the present disclosure clear.

For the same reason, some elements are exaggerated, omitted, or simplified in the drawings and the elements may have sizes and/or shapes different from those shown in drawings, in practice. The same reference numbers are used throughout the drawings to refer to the same or like parts.

Detailed description of well-known functions and structures incorporated herein may be omitted to avoid obscuring the subject matter of the present disclosure. Exemplary embodiments of the present disclosure are described with reference to the accompanying drawings in detail.

According to an embodiment of the present disclosure, the MIMO transmission method and apparatus for use in a wireless communication system is characterized in that the User Equipment (UE) receives Multi User Multiple-Input Multiple-Output (MU-MIMO) transmission mode configuration for interference cancellation through higher layer signaling and uses other control channel analysis and data channel demodulation method in the corresponding mode. Also, the MIMO transmission method and apparatus are characterized in that the UE receives a beamformed channel estimation reference signal configuration from the evolved Node B (eNB) through higher layer signaling and transmits, to the eNB, at least two beam indices or precoder indices or channel estimation reference signal indices for use in data transmission to the UE based on the configuration. The UE transmits the channel quality information corresponding to the at least two beam or precoder indices or channel estimation reference signal indices to the eNB, and the channel quality information may include the channel quality information generated under the assumption of the respective beams or precoder indices or channel estimation reference signal indices and the channel quality information under the assumption of combination of at least two different indices.

The present disclosure includes a method for interpreting the field information of the control channel, received in the case that the UE is configured in the transmission mode for interference cancellation, as the scheduling information for canceling interference on the data channel. The present disclosure includes a method for recognizing the second UE identifier and second eNB identifier used by the UE and the interferer UE for interference cancellation based on the control channel information received in the case that the UE is configured in the proposed transmission mode. The present disclosure also includes a data demodulation method for demodulating data channel of the interference signal based on the second UE identifier and the second eNB identifier and removing the data channel as interference.

The proposed control channel provides a method for the UE to receive information on the RANK1 transmission without interference cancellation (transmission of 1 transport block) and RANK1 transmission with interference cancellation (transmission of 1 transport blocks) and RANK2 transmission with interference cancellation (transmission of 2 transport blocks) using the same control channel. This includes providing the same function as the method of indicating transmission of one data block without interference cancellation, transmission of one data block with interference cancellation, and dynamic transmission of two data blocks without interference cancellation.

In order to solve the above issues, the MIMO transmission method and apparatus for use in a wireless communication system according to an embodiment of the present disclosure includes a method for configuring a MU-MIMO transmission mode capable of cancelling interference to the UE. The present disclosure also includes a channel estimation reference signal allocation and transmission method for MU-MIMO scheduling, a method of beamforming the channel estimation reference signal for configuring at least one virtual cell (beam-based cell) to the terminal, and a method for forming the channel estimation reference signal for MU-MIMO scheduling with a virtual cell as a beam included in the virtual cell. The present disclosure includes a control channel configuration method for MU-MIMO scheduling and instructing interference cancellation to the UE and a method for transmitting a data channel based thereon and a data channel transmission method using the second UE identifier and the second eNB identifier based on the scheduling information. The present disclosure includes a method for allocating same data channel resources to the terminals for interference cancellation and a method for scrambling data channel using the second UE identifier and the second eNB identifier.

The present disclosure includes a method for dynamically transmitting the interference cancellation command through the control channel from the eNB to the UE and a method for dynamically switching between RANK1 and RANK2 and indicating whether enable/disable interference cancellation in RANK1.

In the MIMO transmission method and apparatus for cancelling interference according to an embodiment of the present disclosure, the UE includes a controller for detecting MU-MIMO transmission and interference cancellation command, a receiver for receiving and interpreting the control channel for the MU-MIMO, and a data selector for cancelling interference.

In the MIMO transmission method and apparatus for cancelling interference according to an embodiment of the present disclosure, the eNB includes a controller which performs scheduling for MU-MIMO interference cancellation, a control channel configuration unit which configures a control channel including interference cancellation indicator, and a data channel generator for configuring a data channel to cancel interference.

An embodiment of the present disclosure provides a communication system for transmitting a downlink signal from the eNB to the UE and an uplink signal from the UE to the eNB. The downlink signal may include at least one data channel carrying the information addressed to the UE, a control channel carrying control signal, and a reference signal (RS) for channel estimation and channel feedback. The eNB may transmit data and control information through a Physical Downlink Shared Channel (PDSCH) and a Downlink Control Channel (DL CCH) respectively.

The uplink may include a data channel, control channel, and reference signal transmitted by the UE. The data channel may be transmitted on a Physical Uplink Shared Channel (PUSCH), and the control channel may be transmitted on a Physical Uplink Control Channel (PUCCH).

The eNB may transmit a plurality of reference signals. The reference signals may include at least one of a Common Reference Signal (CRS), a Channel State Information Reference Signal (CSI-RS), and a Demodulation Reference (DMRS) signal.

The CRS may be transmitted in the entire downlink bandwidth, and all of the UEs within the cell may use the CRS for signal demodulation and channel estimation.

In order to reduce the resource amount for use in CRS transmission, the eNB may transmit the UE-specific reference signal (DMRS) at a region scheduled for the UE. In order to acquire channel information, the CSI-RS may be transmitted on the time and frequency axis along with the DMRS.

FIG. 1 is a diagram illustrating a structure of a subframe for use in a system to which the present disclosure is applied.

FIG. 1 shows the structure of a downlink subframe. The eNB performs scheduling in units of subframes, and a subframe 110 is split into two slots as denoted by reference number 120. The downlink subframe 110 consists of $N_{symb}^{DL}$ symbols for transmitting at least one of control channel, data channel, and reference signals.

$M_{symb}^{DL}$ symbols at the beginning of the DL subframe 110 are used for transmitting control channel 130, and the $N_{symb}^{DL}-M_{symb}^{DL}$ symbols may be used for transmitting data channel 140.

The transmission bandwidth includes multiple Resource Blocks (RBs) on the frequency axis, and each RB includes $N_{SC}^{RB}$ subcarriers or REs, and the two slots on the time axis and one RB may be referred to as a PRB pair.

Once the UE has connected to the eNB and completed preparation for data communication, a plurality of identifiers is allocated between the eNB and the UE. The UE is capable of demodulating the control and data channels addressed to it using the identifiers, distinguishing the data address to it from those addressed to other UEs or transmitted on the same resource in other cells so as to mitigate interference based thereon.

If the UE is connected to one eNB, it may distinguish the serving eNB from other eNBs using an eNB ID (Physical Cell Identity, NCellID). This is referred to as the first eNB identifier.

If the UE is connected to the eNB, the eNB allocates Radio Network Temporary Identifier (nRNTI) to the connected UE for identifying the UE within the cell. This identifier allocated to the UE is referred to as UE identifier and, in this embodiment, the identifier allocated to the UE is referred to as the first UE identifier.

The first eNB identifier and the first UE identifier are the identifiers used for the UE to receive data channel from the eNB. This is because a plurality of channel are transmitted using these identifiers. Accordingly, if a signal is received from the eNB, the UE is capable of acquiring data from the received signal using at least one of the first eNB identifier and the first UE identifier.

Figure 2:
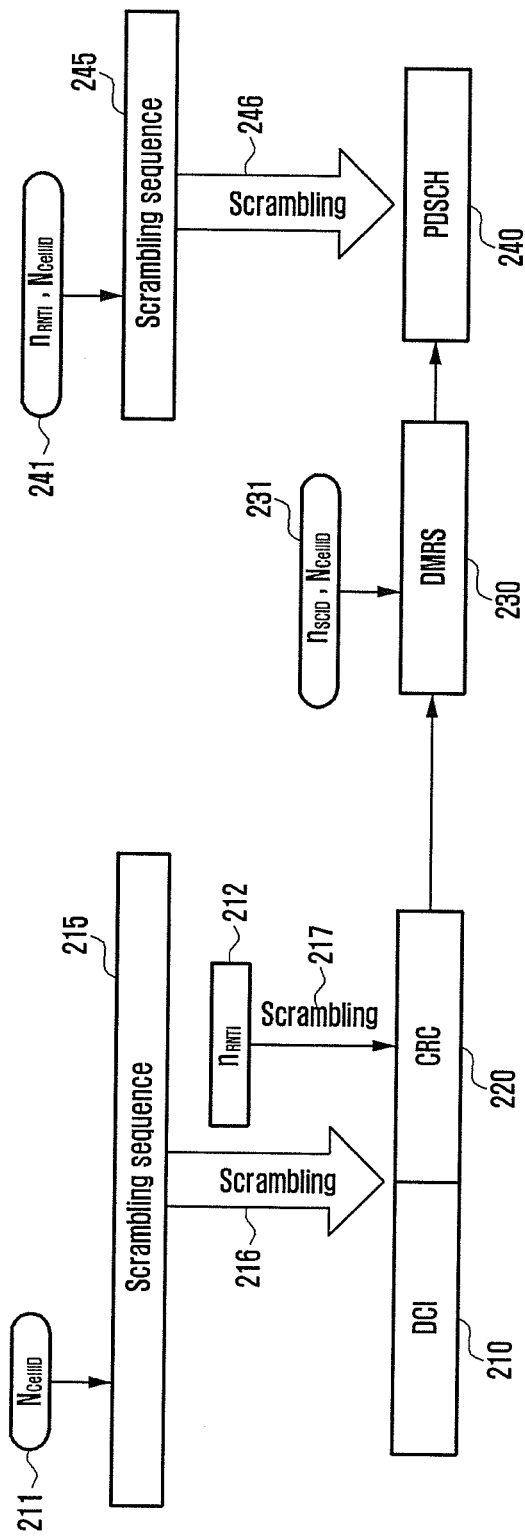
FIG. 2 is a diagram illustrating a procedure of processing a first eNB identifier and a first UE identifier for receiving a downlink data channel from the eNB to the UE according to an embodiment of the present disclosure.

FIG. 2 is a diagram illustrating a procedure of processing the first eNB identifier and the first UE identifier for receiving a downlink data channel from the eNB to the UE according to an embodiment of the present disclosure.

Referring to FIG. 2, in order to receive the data channel 240, the UE receives control channel first. The eNB transmits the control channel containing the Downlink Control Information (DCI) 210.

The DCI 210 is transmitted for various purposes. In an embodiment, the DCI 210 may include the scheduling information on the uplink data channel 240. In another embodiment, the DCI 210 may include one of system information, initial access information, and paging information. In another embodiment, the DCI 210 may include the power control information.

The DCI format may further include Cyclic Redundancy Check (CRC) 220. The UE is capable of identifying the DCI 210 addressed to it.

The DCI 210 may have the CRC 220 scrambled with $n_{RNTI}$ (Radio Network Temporary Identifier) 212.

The eNB allocates Cell-RNTI (C-RNTI) 212 for scheduling the UE and transmits the DCI of which the CRC 220 is scrambled with the C-RNTI.

In order to receive the data channel, each UE has to be allocated a unique nRNTI from the eNB.

In the case where the channel on which a plurality of UEs receives the same information, it is possible for the UEs to use the same RNTI such as RNTI for transmitting system information, RNTI for initial access, and RNTI for paging.

The DCI is scrambled with the scrambling sequence 215 generated with NCellID as a cell identifier in the current subframe as denoted by reference number 216.

In order to receive the DCI 210, the UE generates the scrambling sequence 215 with the first eNB identifier 211 and descrambles the DCI 210 with the scrambling sequence 215. At this time, the UE receives a plurality of DCIs and performs a CRC check with the first UE identifier to determine the presence or absence of the DCI addressed to it.

The UE has to receive the data channel using the scheduling information received through DCI and check the DMRS transmission sequence in the symbol of DMRS 230 to receive the data channel 240 transmitted using DMRS 230. The sequence used for DMRS transmission may be generated with the first eNB identifier and the scrambling indicator ($n_{SCID}$) 231. The UE may receive the first eNB identifier after connecting to the eNB. The scrambling indicator may be acquired based on the DCI 210.

In order to avoid confusion among the UEs within the cell and data channels using the same resource, the eNB generates the scrambling sequence 245 based on the first UE identifier and the first eNB identifier and scrambles the sequence 245 with the data channel 240 as denoted by reference number 246. Through this procedure, it is possible for the UE to avoid receiving the control and data channels addressed to other UEs.

In order to receive the data channel addressed to another UE, the UE has to recognize a 20~30-bit DCI 210 and a 16-bit UE identifier 212 for identifying the DCI 210 and, if it is located at cell boundary, a 9-bit first eNB identifier is further required for that purpose. As a result, in order for one UE to recognize the data addressed to another UE, there may be additional signaling overhead of up to three times.

Figure 3:
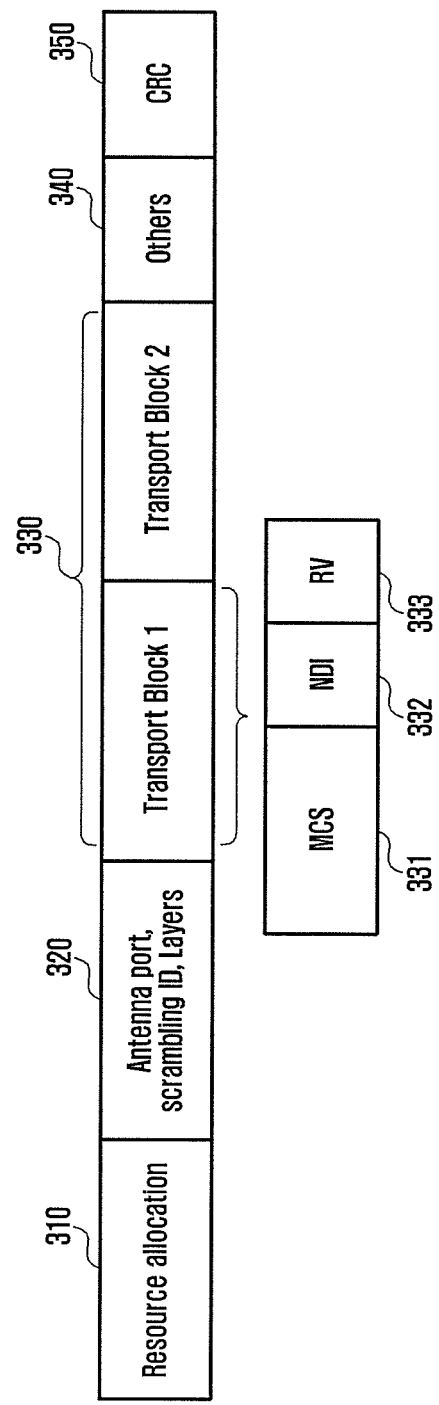
FIG. 3 is a diagram illustrating a format of information including normal downlink DCI.

FIG. 3 is a diagram illustrating a format of information including normal downlink DCI.

Referring to FIG. 3, the DCI may include the information necessary for the UE to receive data. FIG. 3 shows representative control channel information received with the DMRS in the data channel at the UE according to an embodiment of the present disclosure.

The control channel may include scheduling information on the data channel. In an embodiment, the control channel may include resource allocation information 310.

The resource allocation information 310 may include an indicator for allocating frequency resource preferred by the UE in the subframe carrying the control channel. The resource allocation information 310 may be indicated in various manners such as transmitting one bit indicator per resource allocation unit and transmitting a representative value of a start point and a length for allocating a plurality of contiguous resources.

In order to receive the data channel transmitted with the DMRS, the UE has to receive an indication of the DMRS port used for data transmission to it. One PRS includes up to 8 DMRS ports, and the information on the DMRS ports for use in demodulating data channel is transmitted to the UE.

The control channel may include at least one of the indexes of the DMRS port for the scheduled UE, scrambling ID applied to the port for the UE, and total number of layers. In an embodiment, this information may be transmitted as joint-coded with the control channel 320 or independently.

In an embodiment, in order to receive the data channel carrying up to two transport blocks, the data channel includes the information on up to two transport blocks. This transport block information 330 includes a modulation and coding scheme 331 used in transmitting the transport block, a New Data Indicator (NDI) 332 indicating whether the transport block is retransmitted, and a Redundancy Version (RV) 333.

In addition, the control channel may include other information 340 such as a command for instructing transmission of channel estimation information to the eNB and a command for instructing transmission of uplink channel estimation signal, or power control signal.

The control channel may include CRC 350 for use in determining whether the control channel is addressed to the UE. As described with reference to FIG. 2, the CRC 350 may be generated based on the first UE identifier. The CRC generation method according to an embodiment of the present disclosure generates the first UE identifier XOR operation per bit. The eNB configures the control channel as described above according to the decision of the scheduler and the data channel to be transmitted to the UE based on the control channel.

Figure 4:
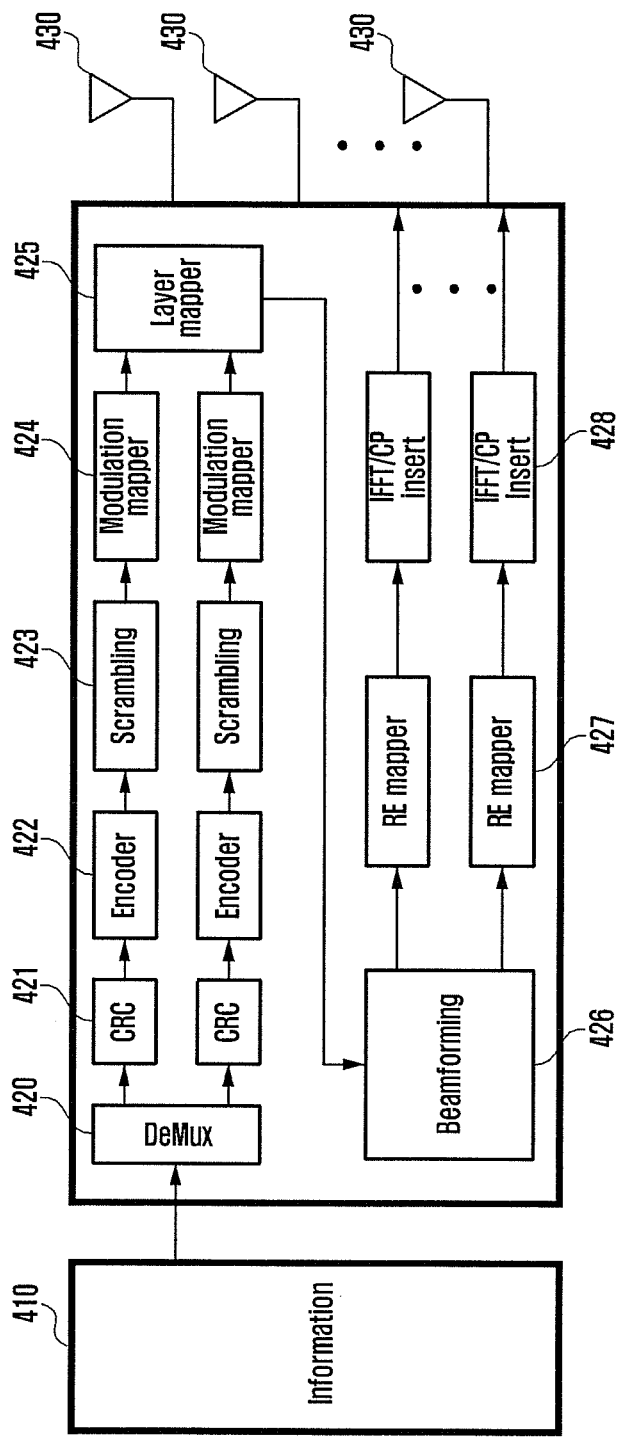
FIG. 4 is a block diagram illustrating a configuration of a data channel transmitter of the eNB according to an embodiment of the present disclosure.

FIG. 4 is a block diagram illustrating a configuration of the data channel transmitter of the eNB according to an embodiment of the present disclosure.

Referring to FIG. 4, the eNB is capable of determining the information 410 to be transmitted to the UE. The Demux 420 demultiplexes the information according to whether the number of transport blocks is 1 or 2.

A CRC 421 is added to each transport block for error correction and then the signal encoded by the encoder 422 at a predetermined coding rate.

The scrambler 423 scrambles the encoded signal based on the first UE identifier and the first eNB identifier to generate a scrambling sequence to be scrambled with the modulated data signal.

The modulator 424 modulates the scrambled data channel at a predetermined modulation rate. The layer mapper 425 maps each modulated transport block to the resource for spatial multiplexing.

The beamformer 426 performs beamforming on the transport block mapped to the resource for transmission to the UE.

The RE mapper 427 maps the beamformed data channel to the physical resource based on the scheduling information.

The IFFT/CP inserter 428 performs Fast Fourier Transform (IFFT) on the data channel mapped to the physical resource and adds Cyclic Prefix (CP) thereto to generate an OFDM signal.

The OFDM signal is transmitted through multiple antennas 430.

Figure 5:
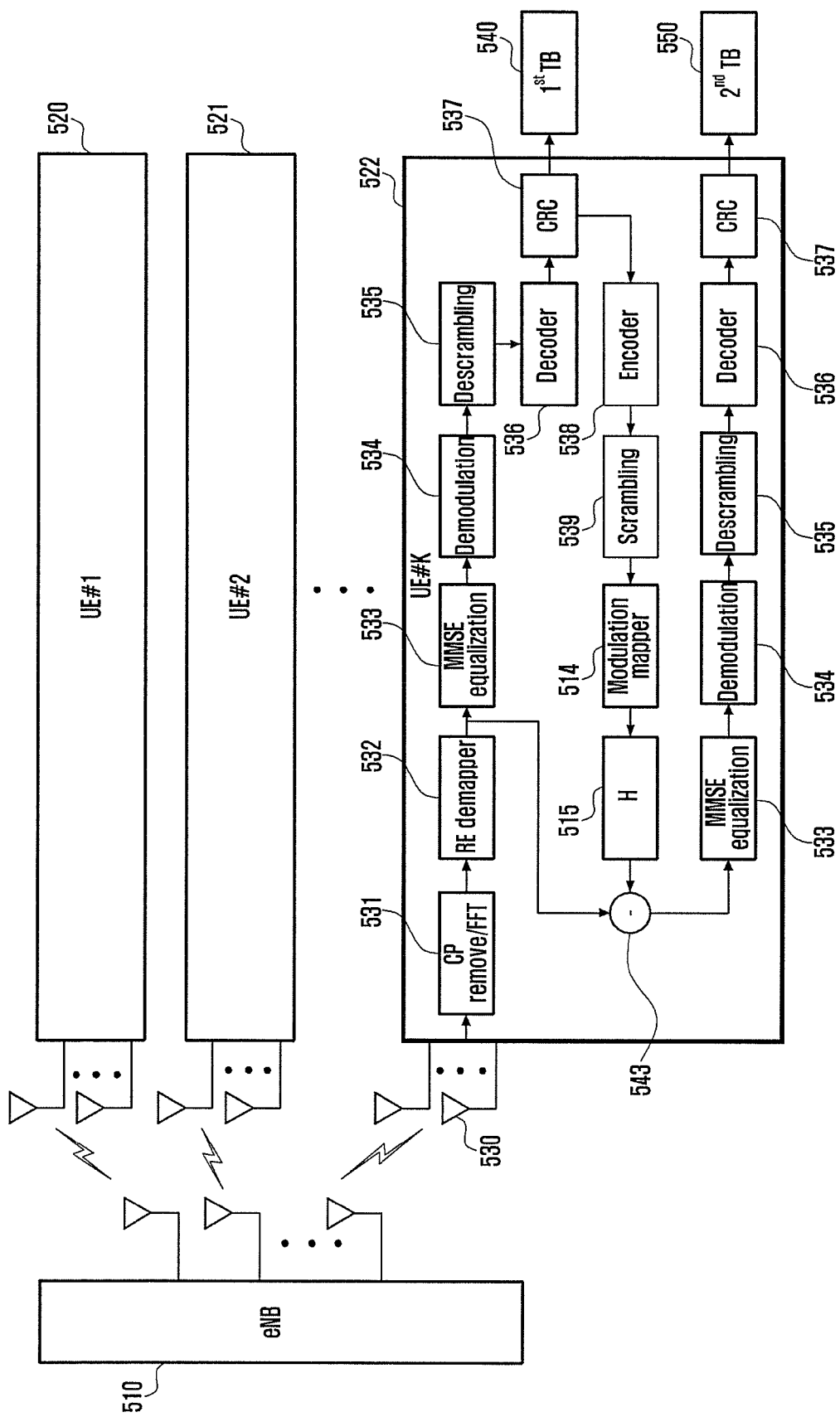
FIG. 5 is a block diagram illustrating a configuration of a data channel receiver of the UE according to an embodiment of the present disclosure.

FIG. 5 is a block diagram illustrating a configuration of the data channel receiver of the UE according to an embodiment of the present disclosure.

The data channel transmitted by the eNB 510 is received by multiple antennas 530 of a plurality of UEs 520, 521, and 522 connectable to the eNB 510.

Each UE receives the control channel transmitted by the eNB 510 to acquire the scheduling information, checks the information on the data channel addressed to it based on the scheduling information of the control channel, and receives the signal transmitted by the eNB 510 based on the data channel information.

In an embodiment, the CP remove/FFT 531 removes the CP from the data channel received through the antenna 530 and performs Fast Fourier Transform (FFT) on the received signal to extract the signal.

The RE demappers 532 performs RE-demapping on the extracted signal.

The Minimum Mean Square Error (MMSE) Equalizer 533 establishes a channel for receiving the first transport block based on the scheduling information and the channel information in DMRS.

The demodulator 534 performs demodulation on the established channel, and the descrambler 535 performs descrambling on the first transport block using the scrambling signal generated based on the first UE identifier and the first eNB identifier. The decoder 536 processes the descrambled signal to generate the first transport block.

The CRC checker 537 checks the CRC to determine whether the received signal has an error and, if there is no error, recognizes the received signal as the first transport block as denoted by reference number 540.

If the first transport block 540 is received successfully, the UE removes the first transport block 540 from the original signal to improve the reception performance for receiving the second transport block 550. In an embodiment, such an operation is referred to as Self-Interference Cancellation (SIC).

For SIC, the UE may add CRC to the first transport block which has been demodulated.

The encoder 538 encodes the signal including the first transport block to which CRC is added.

Afterward, the UE performs scrambling and modulation by means of the scrambler 539 and modulation mapper 514 in the same way as the eNB's transmission operation.

Here, the UE may multiply the channel to the first transport block demodulated using the reception channel information 515 in DMRS to convert the signal to the state before passing the MMSE equalizer 533.

Afterward, the remover removes the first transport block signal demodulated successfully from the signal before passing the MMSE equalizer 533.

The signal from which the first transport block signal has been removed passes the MMSE equalizer 533 and then is processed through the same procedure as the first transport block 540 reception so as to receive the second transport block 550.

In an embodiment, the UE is capable of increasing the reception performance on the second transport block 550 by removing the first transport block signal which has been received successfully from the channel on which the first and second transport blocks received as overlapped. If the first transport block is received successfully, the UE is capable of cancelling the self-interference from the received signal based on the successfully received first transport block 540.

Figure 6:
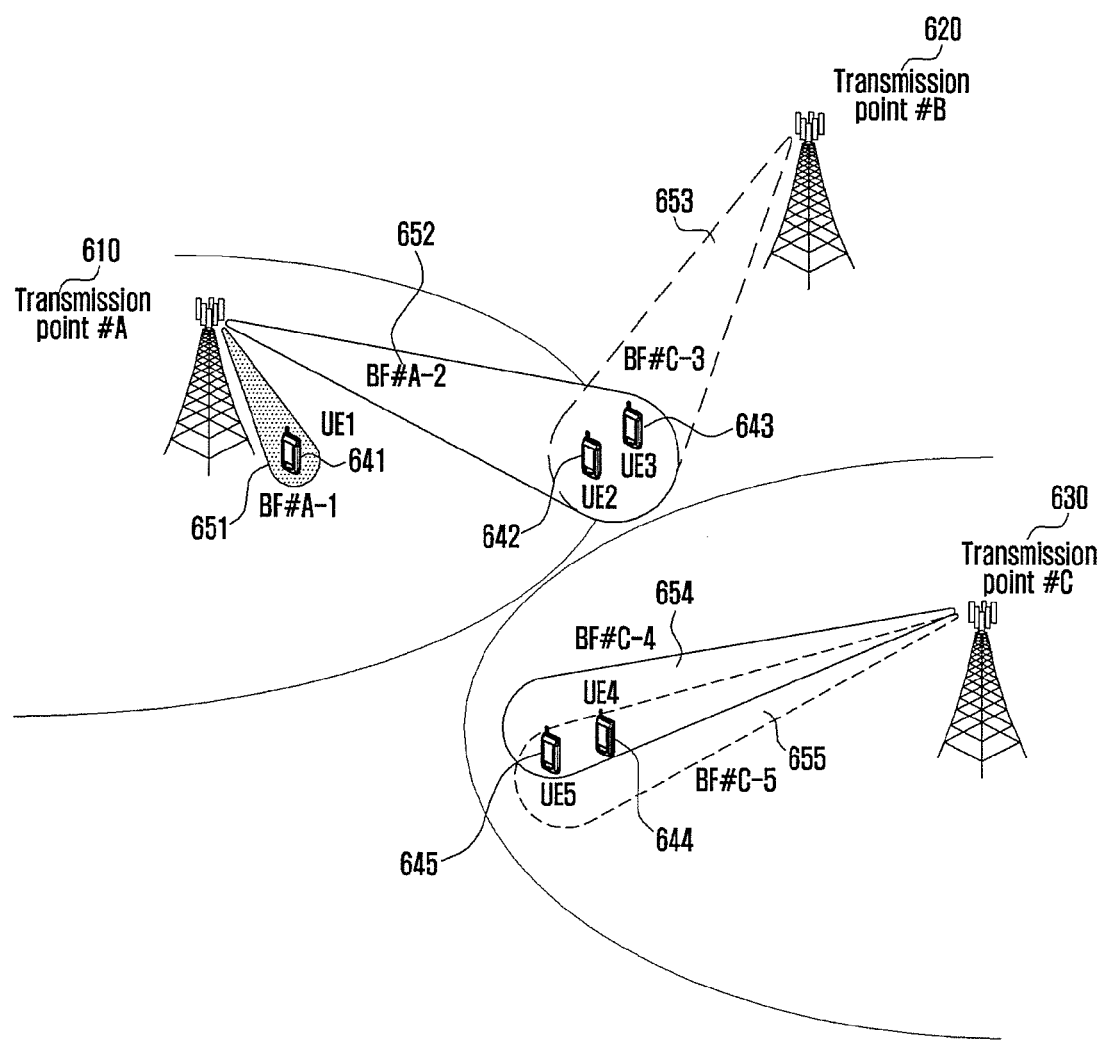
FIG. 6 is diagram illustrating an operation scenario for interference control between the eNB and the UE according to an embodiment of the present disclosure.

FIG. 6 is diagram illustrating an operation scenario for interference control between the eNB and the UE according to an embodiment of the present disclosure.

Referring to FIG. 6, the eNBs 610, 620, and 630 may schedule a plurality of UEs 641, 642, 643, 644, and 645 simultaneously using a plurality of beams 651, 652, 653, 654, and 655.

It is possible to consider three scheduling scenarios in which the eNBs 610, 620, and 630 schedule the UEs 641, 642, 643, 644, and 645 using a plurality of beams 651, 652, 653, 654, and 655.

This first scenario includes scheduling the UEs near and far from the eNB within one cell simultaneously.

The second scenario includes scheduling two UEs within a cell using different beams simultaneously.

In the case of using a plurality of beams for scheduling, it may be considered to schedule between adjacent cells, and this is the case where the two adjacent UEs are scheduled by different eNBs.

Referring to FIG. 6, the UE 1 641 and the UE 2 642 are within the coverage area of the cell A 610. The UE 1 641 is located near the eNB of cell A 610 in the scheduling area and the UE 2 642 is located farther from the eNB of cell A 610.

At this time, the eNB is capable of scheduling the UEs distant from each other spatially using different beams. The eNB of cell A 610 performs transmission to the UE 1 641 using beam #A-1 651 at low transmit power level and the UE 2 642 using beam #A-2 652 at high transmit power.

The UE 2 642 and the UE 3 643 are close to each other geographically but served by different eNBs.

In this case, the UE 2 642 receives the signal transmitted by the eNB of cell A 610 through beam #A-2 652, and the UE 3 643 receives the signal transmitted by the eNB of cell B 620 through beam #-3 653.

In an embodiment, the UEs close to each other geographically may receive signals through different beams transmitted by the same eNB. The UE 4 644 and the UE 5 645 may receive the signals transmitted by the eNB of cell C 630 through beam #C-4 654 and beam #C-5 655 respectively.

In an embodiment, the beamforming-based MU-MIMO scheduling may cause interference between scheduled UEs.

In the first scenario, although they are separated spatially, the UE 2 642 is located at a position relatively far from the eNB of cell A 610, the eNB of cell A 610 forms the beam #A-2 652 at a relatively high transmit power as compared to the beam #A-1 651. Accordingly, when the UE 1 641 receives the signal on the beam #A-2 652, since the transmit power of the beam #A-1 651 is too low in spite of low transmit power of the beam #A-2 652, the interference caused by the beam #A-2 652 component may be felt as relatively high.

In the second scenario where the UEs located at close positions geographically are scheduled by different eNBs, each UE may experience interferences from other cells. In an embodiment, the UE 2 642 and the UE 3 643 may be affected by interference of the signal transmitted by neighbor cells.

Finally, in the third scenario, although the UEs are located far enough from each other, the beams preference by the UEs may be overlapped or interfere with each other. In an embodiment, the UE 4 644 and the UE 5 645 may interfere with each other. However, the above described embodiment is applicable to interference situations occurring in signal communication between the UE and the eNB in addition to the above three scenarios.

In such a case, although the beams are formed in separation from each other spatially, interference may occur due to the MU-MIMO scheduling. For efficient MU-MIMO transmission based on the beamforming, the eNB selects the UEs to which simultaneous transmission is possible for MU-MIMO scheduling; and when the MU-MIMO scheduling causes interference, it is necessary to cancel the interference so as to achieve the scheduling performance and UE's reception performance. However, if the UE considers the interferences to all of the UEs within the cell, the MU-MIMO scheduling complexity increases significantly and the eNB has to notify the UEs of the scheduling information on all of the UEs, resulting in increase of overhead. Accordingly, the present disclosure proposes a method for managing cells efficiently for efficient MU-MIMO scheduling and providing the simultaneously scheduled UEs with scheduling information while minimizing extra information to be transmitted to the UEs.

Figure 7:
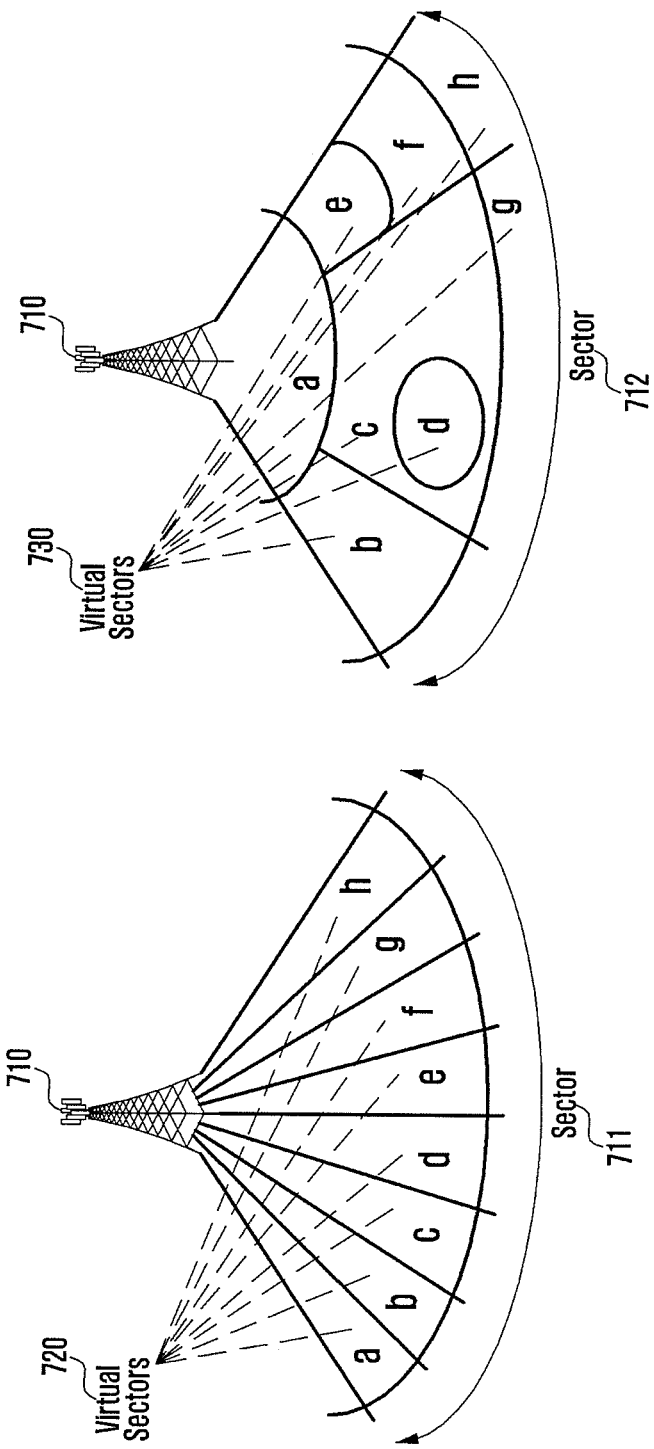
FIG. 7 is a diagram illustrating a concept of operating virtual cells based on beamforming of the eNB according to an embodiment of the present disclosure.

FIG. 7 is a diagram illustrating a concept of operating virtual cells based on the beamforming of the eNB according to an embodiment of the present disclosure.

Referring to FIG. 7, in order to perform MU-MIMO scheduling efficiently in the way of maximizing the spatial multiplexing performance, the eNB may operate a plurality of virtual cells corresponding to one cell. The eNB 710 is capable of operating a plurality of sectors 711. The UE communicating signals with the eNB 710 may recognize one of the sectors as a cell.

In another embodiment, the eNB 720 may split a cell into a plurality of virtual cells and spatially multiplex the UEs within the cells. For this purpose, the eNB allocates the first channel estimation reference signal as common signals to all the UEs and transmits beams formed in such a way of discriminating among the virtual cells on the corresponding REs of the resource. The eNB 720 may form a beam to establish the sector 712. For example, in the case that the CSI-RS is mapped to total of 8 REs, the eNB 720 performs beamforming per RE, and all of the UEs feed back the information indicating the virtual cell in which it is located based on the Reference Signal Receive Power (RSRP) on the corresponding resource such that the eNB is capable of checking the virtual beam for the best channel to the UE. In an embodiment, the virtual beam is not used just for splitting the cell area geographically.

In an embodiment, the eNB 710 may split the sector 712 as shown in FIG. 7. A more advanced eNB is capable of performing various types of beamforming which includes a method for forming the beams restricted within a geographical area as the virtual sectors 730 and a method for forming the split beams according to the distance from the eNB. Such beamforming techniques are capable of forming sectors according to the geographical shape, buildings, and small eNBs deployed within the cell and make it possible to form the channel estimation resource to the UE as a beam of a virtual cell such as virtual sectors 730.

If the eNB transmits a reference signal by forming the virtual beams on the channel estimation reference signal, the UE reports received reference signal strength measured by the UE on the channel estimation resource and the eNB checks the UE location based on the reported received reference signal strength, it is capable of allocating the second channel estimation reference signal for per-UE scheduling. A beam included in or overlapped partially with a virtual cell may be used in the channel estimation reference signal, and the signal may be transmitted using the beam included in or overlapped with the adjacent virtual cells. The main difference between the first and second channel reference signals is the difference in update period. The first channel estimation reference signal is used for the UE moving fast or performing handover; it does not change almost within one cell until the cell is changed. However, the second channel estimation reference signal changes fast to change the beamforming for the UE moving slowly in the virtual cell or used by the eNB for scheduling.

In an embodiment, the first channel estimation reference signal may indicate the resource change through higher layer signaling. Once the resource position has been informed to the UE, the beam used for the second channel estimation reference signal may change continuously without the UE's recognition. The beam of the second channel estimation reference signal may be depicted spatially as shown in FIG. 8.

Figure 8:
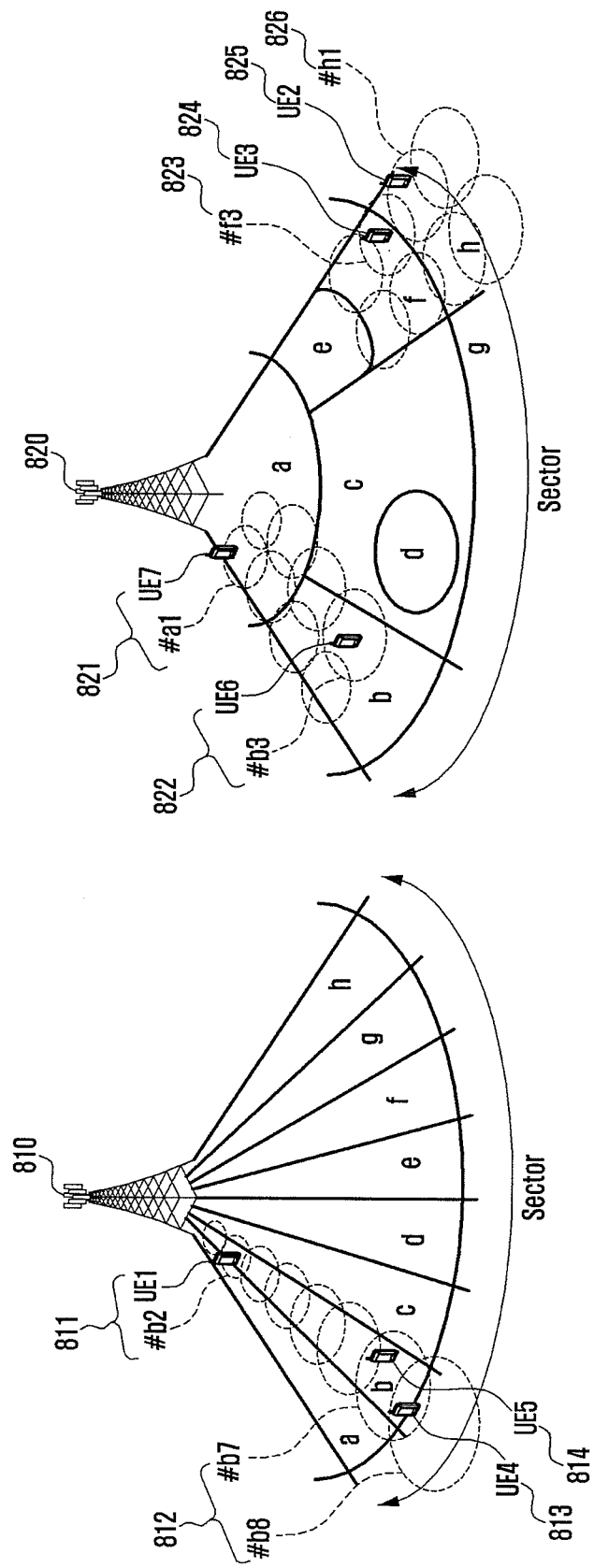
FIG. 8 is a diagram illustrating a method for an eNB to operate MU-MIMO using beamforming in a virtual cell according to an embodiment of the present disclosure.

FIG. 8 is a diagram illustrating a method for an eNB to operate MU-MIMO using beamforming in a virtual cell according to an embodiment of the present disclosure.

Referring to FIG. 8, the second channel estimation reference signal is configured for MU-MIMO scheduling such that when a UE is located in a certain virtual cell, the eNBs 810 and 820 are capable of forming at least one beam for the corresponding cell area on the second channel estimation reference signal and allocating it to the UE.

In an embodiment, three UEs 811, 813, and 814 located within the virtual cell b formed by the eNB 810 may be allocated the same second channel estimation reference signal resource.

In another embodiment, in the case that the eNB 802 establishes irregular virtual cells, although there is one UE within a certain virtual cell, it is possible to be allocated a plurality of second channel estimation reference signal resources. Even when one UE is located within a virtual cell, it is possible to ensure the mobility of the UE and perform the interference cancellation scheduling to the UE located at a boundary of the virtual cell by being allocated a plurality of second channel estimation reference signals.

In the case that the UE 7 821 and the UE 6 822 are located in different virtual cells, the UE 7 821 and the UE 6 822 are allocated the same two second channel estimation reference signal resources that can be selected as beams for scheduling the virtual cells b and a.

This configuration may be applied to the UEs located at the boundary of the cell formed by the neighbor eNB such as UE 3 824 and UE 2 825 and, in this case, each UE is capable of receiving at least two second channel estimation reference signal resources, each resource being formed as a beam that can be scheduled in a plurality of adjacent virtual cells and transmitted to the UE.

If the second channel estimation reference signal is received for scheduling, the UE is capable of perform feedback based thereon.

According to an embodiment, since #b8 and #b7 812 among the beams formed by the second channel estimation reference signal are overlapped, the UE 4 813 may feed back the indices of the corresponding beams to the eNB. The index of the beam preferred by the UE is identical to the position of the second channel estimation reference signal or corresponding value. The UE has to transmit Channel Quality Indicator (CQI) generated based on the index to the eNB and transmit CQI generated under the assumption of using the selected beam for the case where the single beam-based scheduling is preferred or CQI generated in consideration of interference between beams in the case of assuming use of both the two preferred beams.

In the case that the eNB use one of the two methods selectively, the UE has to transmit all of the above described channel quality information to the eNB. In the case that the UE 5 814 and the UE 1 811 select one beam, the UE transmits the preferred beam and the channel quality value corresponding thereto, and the eNB is capable of MU-MIMO scheduling a combination of the UE 4 813 and UE 5 814, UE 5 814 and UE 1 811, or UE 4 813 and UE 1 811 on the time-frequency resource simultaneously.

In the case of MU-MIMO scheduling the UE 4 813 and UE 5 814, the eNB is capable of recognizing that the UE 5 814 prefers one of the two preferred beams fed back by the UE 4 813 and thus transmitting information instructing the UE 4 813 to remove the interference caused by the simultaneous scheduling. Accordingly, the data channel for the UE 4 813 is transmitted through #b8 and the information instructing removal of it to another UE through #b7. In this case, since it is possible to increase the reception performance by removing the interference, the eNB 810 is capable of improving the cell performance significantly as compared to the case where the UE 4 814 and the UE 5 815 cannot perform transmission simultaneously due to the interference therebetween.

Figure 9:
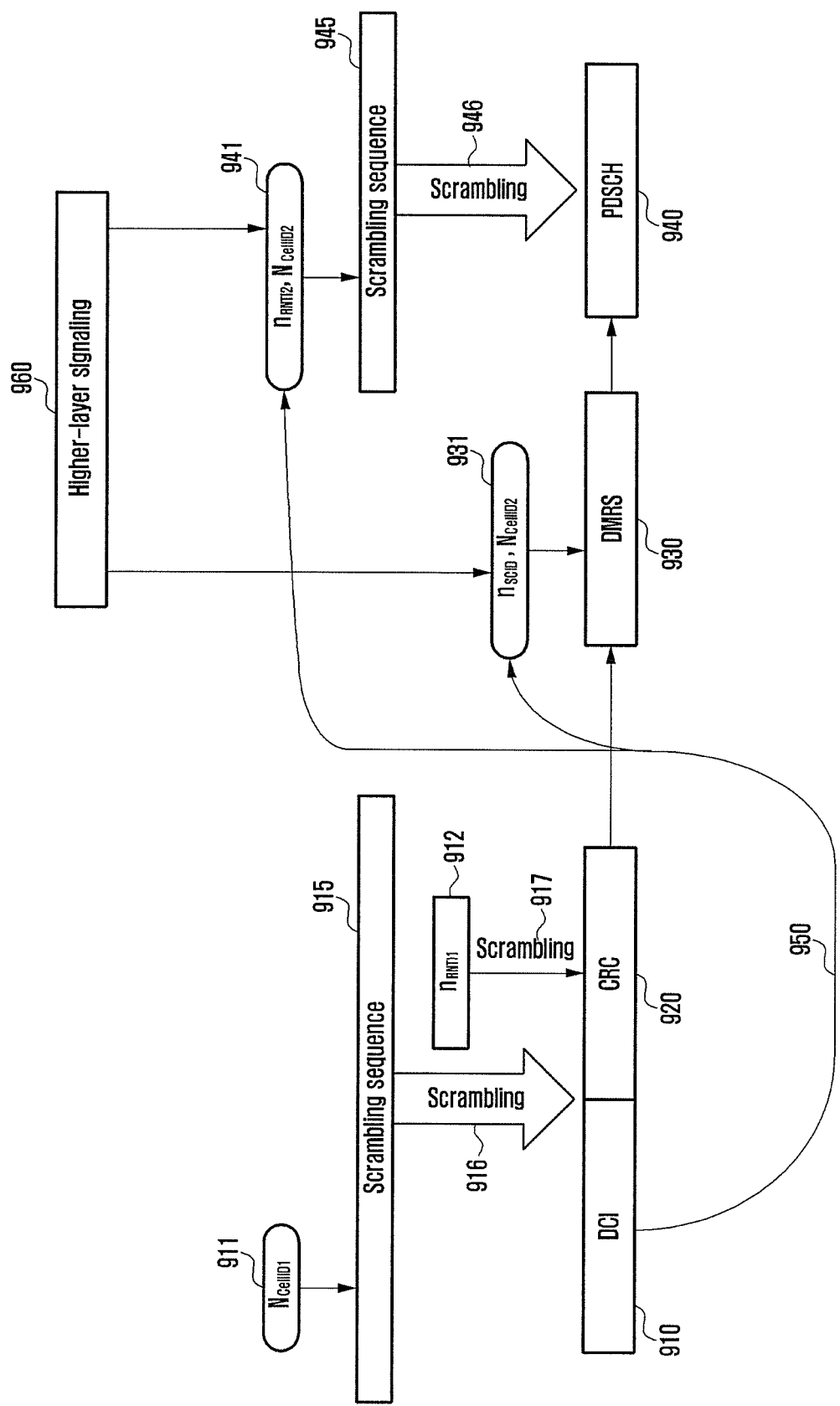
FIG. 9 is a diagram illustrating a procedure of recognizing a second UE identifier and a second eNB identifier between the eNB and the UE according to an embodiment of the present disclosure.

FIG. 9 is a diagram illustrating a procedure for recognizing the second UE identifier and the second eNB identifier between the eNB and the UE according to an embodiment of the present disclosure. The second UE identifier and the second eNB identifier are a certain UE identifier and eNB identifier useful for canceling interference other than the first UE identifier and the first eNB identifier allocated in the initial cell access procedure of the UE configured with the MU-MIMO transmission for interference cancellation, and these are the identifiers capable of recognizing the second UE identifier and second eNB identifiers used by adjacent UEs as well as the identifiers of the UE.

Referring to FIG. 9, the UE and the eNB may receive the data channels of other UEs for removing the interference to the UE in MU-MIMO transmission. In order to receive the data channels of other UEs, it is necessary to check the unique information on the corresponding UE and, in this embodiment, it is possible to check the second UE identifier and the second eNB identifier of other UEs for cancelling information therefrom based on the control channel for MU-MIMO interference cancellation and CSI-RS configuration information.

The UE connects to the eNB to receive the first eNB identifier 911. The eNB may receive the control channel scrambled with the scrambling sequence 915 generated based on the first eNB identifier 911 as denoted by reference number 916. At this time, it is necessary for the UE to receive a plurality of control channels 910 from the eNB simultaneously and check the scheduling information allocated to the UE among a plurality of received control channels 910. At this time, the eNB scrambles the first UE identifier 912 of the UE receiving data with the CRC 920 included in the control channel 910 as denoted by reference number 917. Through this procedure, the UE is capable of checking the scheduling information allocated by the eNB. In an embodiment, since the first TB, among the two TBs, carries the scheduling information addressed to it and the second TB carries the information addressed to the other UE for interference cancellation, it is necessary for the UE to recognize the first UE identifier and the first eNB identifier of the corresponding UE for receiving data channel of the other UE.

In an embodiment, the TB information of other UEs may be transmitted through the control channel and the data addressed to the other UEs may not be transmitted. Accordingly, the UE operating in the transmission mode determined according to a rule between the eNB and the UE uses the second UE identifier and the second eNB identifier for transmission.

If the control channel information 950 is received, the UE is capable of recognizing $n_{SCID}$ and the second eNB identifier 931 for receiving DMRS of the data channel based on the corresponding information and the CSI-RS configuration information 960 received through higher layer signaling. The UE is also capable of canceling interference between the data to be received based on the second UE identifier and the second eNB identifier 941 and the other signal. In order to receive the data channel allocated to it based on the second UE identifier and the second eNB identifier 941, the UE estimates the channel using the second eNB identifier allocated to the UE to be removed and generates a scrambling sequence of the data channel 940 with the second UE identifier and the second eNB identifier 941.

For interference cancellation, it is possible to cancel the interference with the previous demodulated signal and receive the data channel using the second UE identifier and the second eNB identifier 941 of the UE on the allocated resource. Through this procedure, it is possible to improve the data channel reception performance of the UE experiencing significant interference and increase the cell throughput with MU-MIMO transmission.

Figure 10:
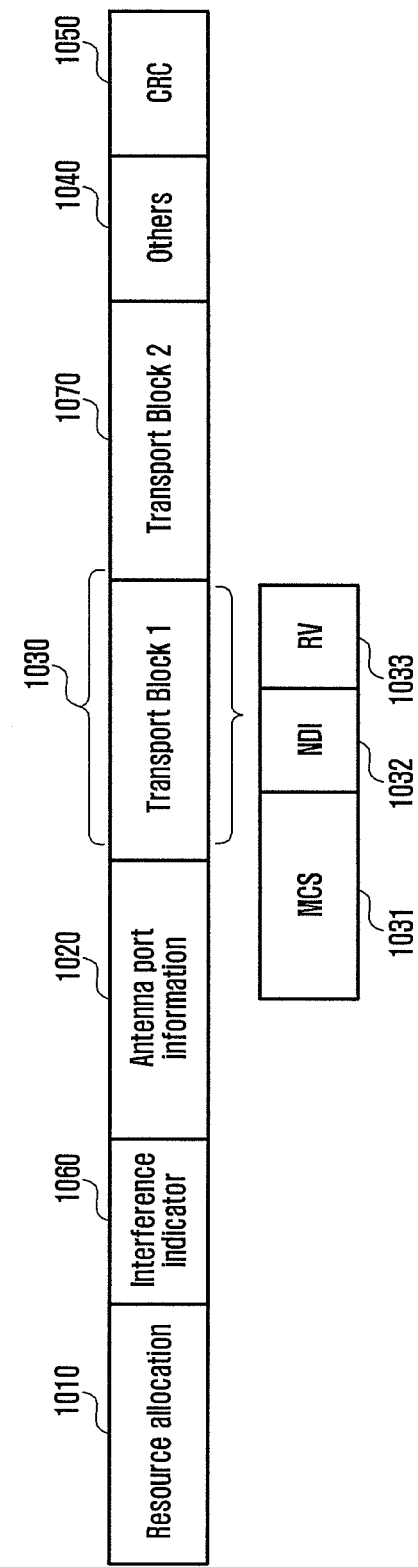
FIG. 10 is a diagram illustrating a control channel structure for interference control according to an embodiment of the present disclosure.

FIG. 10 is a diagram illustrating a control channel structure for interference control according to an embodiment of the present disclosure.

Referring to FIG. 10, in order to transmit the control channel for interference cancellation, the control channel includes the interference cancellation indicator and the information on the reference signal used by the interferer. The control channel also includes information on the two transport blocks. In an embodiment, the information included in the first transport block is the scheduling information addressed to it, and the information included in the second transport block is its scheduling information or interferer scheduling information determined by the interference cancellation indicator. The transmission order of the transport blocks may be changed depending on the embodiment.

Referring to FIG. 10, the control channel structure may include the location information 1010 on the allocation resource in the scheduling information of the data channel of the UE. The resource location information is included even when the scheduling information of the interferer UE is included, and the eNB is capable of transmitting the data channel to the UE at the same location as the resource location of the data channel transmitted to the corresponding UE in the case of performing interference cancellation with the above-described control channel.

The control channel structure may include the interference indicator 1060. The interference indicator 1060 may include 1 or 2 items of information. The information of the interference indicator 1060 may include the information indicating whether the information on at least two transport blocks TB0 and TB1 included in the received control channel is the information addressed to the UE or the interferer.

In an embodiment, a 1-bit interference indicator may be used as follows:
 "0"—Rank 2, self-interference cancellation (TB0, TB1—desired);
 "1"—Rank 1, TB0—desired, TB1—interference.
In another embodiment, a 2-bit interference indicator may be used as follows:
 "00"—Rank 2, self-interference cancellation (TB0, TB1—desired), $n_{SCID}$=0;
 "01"—Rank 1, TB0—desired, $n_{SCID}$=0 TB—interference;
 "10"—Rank 1, TB0—interference TB1—desired, $n_{SCID}$=1;

"11"—Rank 2, self-interference cancellation (TB0, TB1—desired), $n_{SCID}=1$.

In another embodiment, a 2-bit interference indicator may be used as follows:

"00"—Rank 2, self-interference cancellation (TB0, TB1—desired);
"01"—Rank 1, TB0—desired, TB1—interference;
"10"—Rank 1, TB0—interference TB1—desired;
"11"—Rank 2, self-interference cancellation (TB0, TB1—desired).

The DMRS information for use in each data transport block may be included in DMRS port information 1020.

In an embodiment, a 3-bit DMRS antenna information field may be used as follows:

"000"—Port 7, 8 with $n_{SCID}=0$;
"001"—Port 7, 8 with $n_{SCID}=1$;
"010"—Port 7 with $n_{SCID}=0$, Port 8 with $n_{SCID}=1$;
"011"—Port 7 with $n_{SCID}=1$, Port 8 with $n_{SCID}=0$;
"100"—Port 7, 9;
"101"—Port 7, 10;
"110"—Port 8, 9;
"111"—Port 8, 10.

In another embodiment, a 2-bit DMRS antenna information field may be used as follows:

"00"—Port 7, 8 with $n_{SCID}=0$;
"01"—Port 7, 8 with $n_{SCID}=1$;
"10"—Port 7 with $n_{SCID}=0$, Port 8 with $n_{SCID}=1$;
"11"—Port 7 with $n_{SCID}=1$, Port 8 with $n_{SCID}=0$.

In another embodiment, a 2-bit DMRS antenna information field may be used as follows:

"00"—Port 7, 9;
"01"—Port 7, 10;
"10"—Port 8, 9;
"11"—Port 8, 10.

The proposed antenna port information 1020 has to include at least two different port indices for use in transmitting at least two TBs included in DCI and the scrambling initial value information ($n_{SCID}$), and those are joint-coded to be transmitted.

An embodiment proposes a method for determining the second eNB identifier. In an embodiment, the eNB transmits a certain second eNB identifier to the UE through higher layer signaling. In another embodiment, the second eNB identifier is determined based on the function of the CSI-RS port for determining the above-described virtual cell. For example, in the case that there are 8 CSI-RS ports (i.e. ports 0 to 8), the CSI-RS port index selected by the UE may be determined as the first eNB identifier. The interference cancellation in MU-MIMO transmission may be required for the UEs close to each other, because the interference occurs between the UEs located within the same virtual cell.

In an embodiment, a method for determining the second UE identifier is described. In an embodiment, the second UE identifier may be determined based on equation (1), CSI-RS set configured for scheduling UE, and DMRS port information 1020 scheduled currently. The second UE identifier may be configured by multiplying the total number of available DMRSs ($N_{DMRS\_MAX}$) and the currently configured CSI-RS set index value, and adding the current used DMRS port index. For this purpose, the CSI-RS resource configures the set index in an ascending order of frequency index with earlier in time, or a descending order of frequency index with the earlier in time. In this case, the UEs using the same CSI-RS cell, among the UEs within all of the virtual cells of the cell, may have different second UE identifiers. The second UE identifier recognition method proposed in the present disclosure includes a method for generating the second UE identifier based on the CSI-RS configuration information allocated to the UE and the DMRS port information scheduled with DCI. In this case, it is possible to allocate different second UE identifiers to the cell within the virtual cell. Since the eNB uses the same identifier as the first UE identifier, it may differentiate between the second UE identifier regions or allocate different values in order to prevent the second UE identifier from being generated as the first UE identifier within the cell.

$$n_{RNTI2}=f(\text{DMRS port index})+f(\text{CSI-RS set}) \quad (1)$$

$$n_{RNTI2}=N_{DMRS\_MAX}*(\text{CSI-RS-set-index})+\text{DMRS-port-index} \quad (2)$$

Figure 11:
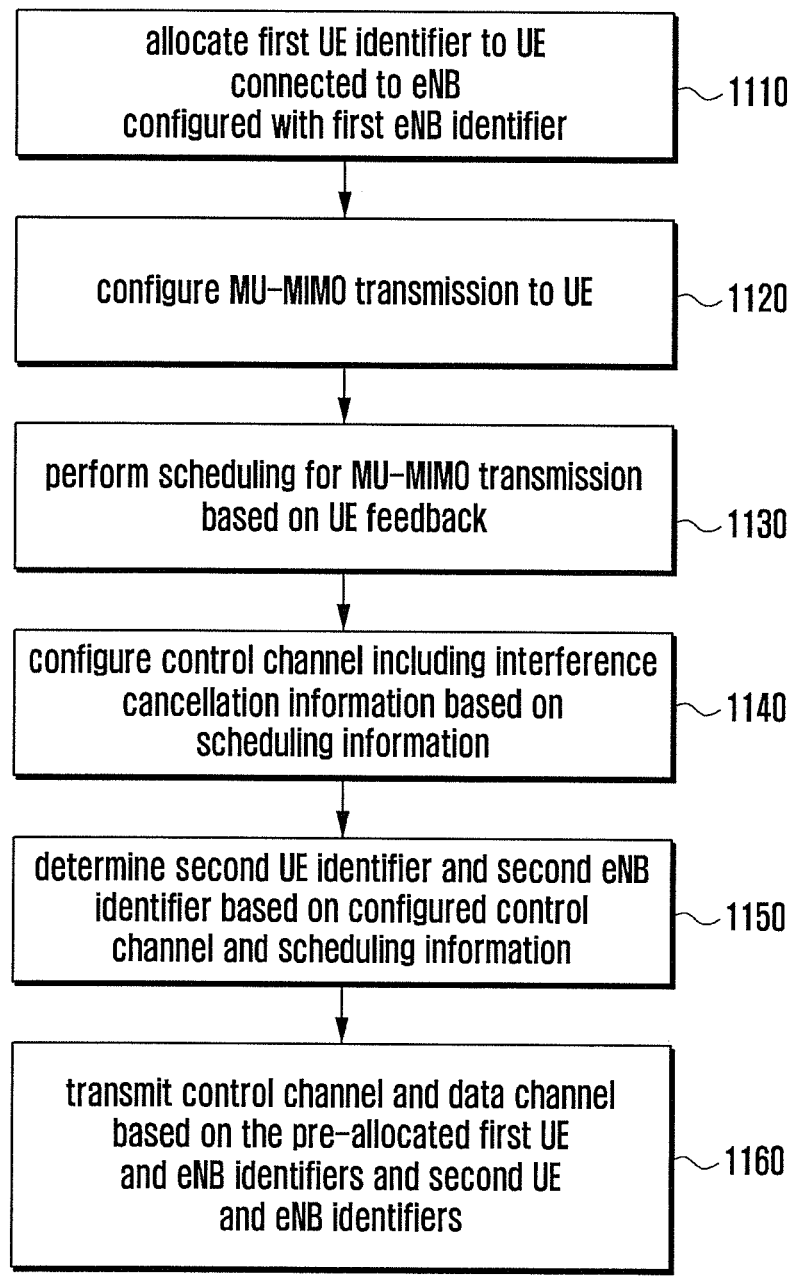
FIG. 11 is a flowchart illustrating an interference cancellation method of the eNB according to an embodiment of the present disclosure.

FIG. 11 is a flowchart illustrating the interference cancellation method of the eNB according to an embodiment of the present disclosure.

Referring to FIG. 11, the eNB configures its eNB identifier as the first eNB identifier and allocates the first UE identifier to the UE connected thereto at operation 1110. The eNB identifier is determined by the network and sent to the eNB or stored in the storage of the eNB or received as external input.

The eNB may configure the UE in the MU-MIMO transmission mode, interference cancellation reception mode, or corresponding transmission mode. The eNB may transmit the information necessary for the UE to operate in the MU-MIMO transmission mode or interference cancellation mode.

The eNB may perform MU-MIMO scheduling based on the feedback of the UE at operation 1130. The eNB may perform the MU-MIMO scheduling appropriate for transmission based on the feedback information transmitted by the UE.

At operation 1140, the eNB may configure the control channel based on the scheduling information determined at operation 1130. At this time, if interference cancellation is required between UEs scheduled on the same resource, it is possible to configure the control channel for interference cancellation along with the information thereon.

At operation 1150, the eNB may determine the second UE identifier and the second eNB identifier based on the control channel and the scheduling information configured at operation 1140.

At operation 1160, the eNB configures the control channel and data channel of the corresponding UE based on at least one of the second UE identifier and the second eNB identifier determined at operation 1150 and transmits the control and data channel to the UE.

Figure 12:
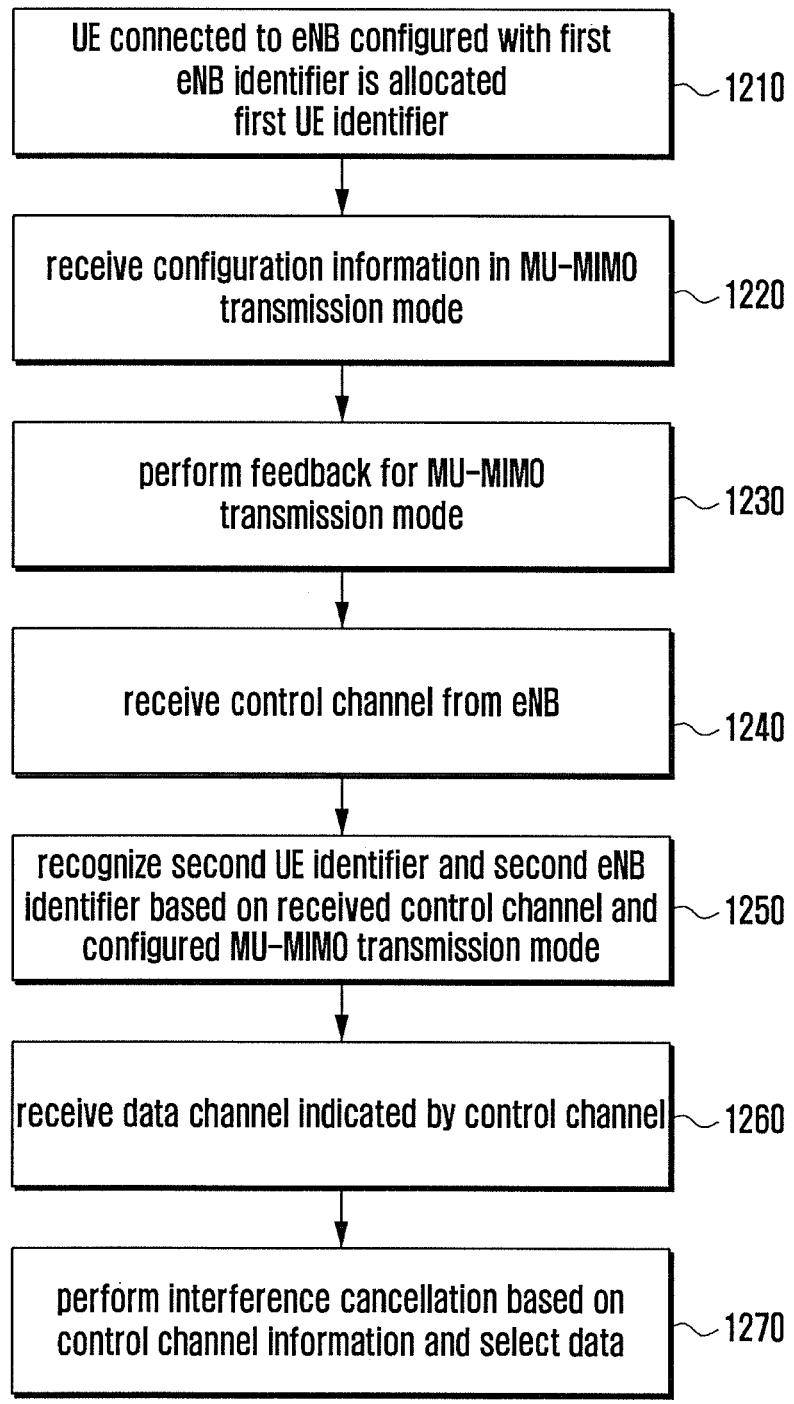
FIG. 12 is a flowchart illustrating an interference cancellation method of the UE according to an embodiment of the present disclosure.

FIG. 12 is a flowchart illustrating the interference cancellation method of the UE according to an embodiment of the present disclosure.

Referring to FIG. 12, the UE connects to the eNB to receive the first UE identifier at operation 1210. The UE is capable of identifying the eNB identifier of the connected eNB as the first identifier. According to an embodiment, the UE may receive the first eNB identifier from the eNB.

The UE receives the configuration information for use in the interference cancellation mode or MU-MIMO transmission mode or a certain transmission mode capable of cancelling interference at operation 1220. According to an embodiment, the UE is capable of receiving transmission mode configuration information based on the information received at operation 1210.

At operation 1230, the UE performs feedback in the transmission mode configured based on the information received from the eNB at operation 1220. According to an embodiment, the UE transmits at least one of a UE-preferred scheduling beam index, corresponding channel estimation reference signal index, and precoding index to the eNB; and may transmit the channel quality information on the at least one information to the eNB according to a combination of beams used.

At operation 1240, the UE may receive the control channel for scheduling determined based on at least one information transmitted at operation 1230.

At operation 1250, the UE may recognize the second UE identifier and the second eNB identifier based on at least one of the received control channel, configured transmission mode, and configuration information.

At operation 1260, the UE may receive the data channel based on the scheduling information received in the control channel.

At operation 1270, the UE may perform data channel demodulation on the signal received from the eNB based on at least one of the second UE identifier and the second eNB identifier recognized at operation 1250. The UE also may perform interference determination on the data information demodulated according to the control channel information. If it is determined that the data information is interference, the UE discards the interference and, otherwise, delivers the data to the higher layer. In an embodiment, the UE performs interference cancellation and selects data received from the eNB at operation 1270.

Figure 13:
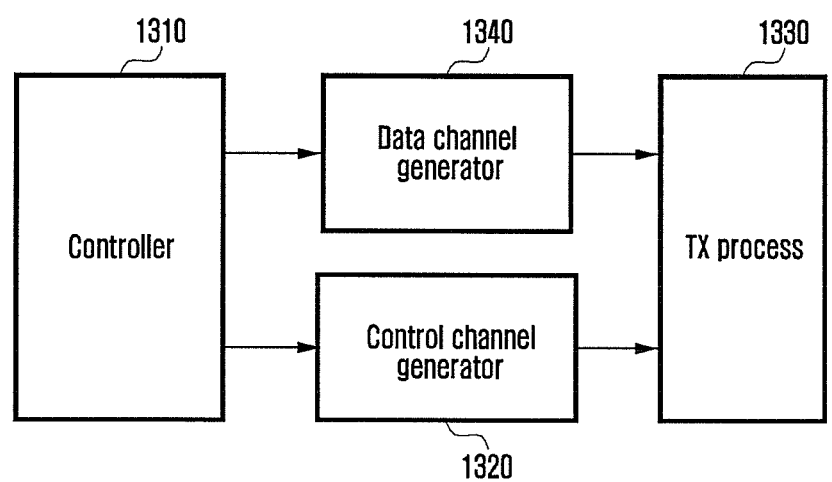
FIG. 13 is a diagram illustrating a configuration of the eNB for interference cancellation transmission according to an embodiment of the present disclosure.

FIG. 13 is a diagram illustrating a configuration of the eNB for interference cancellation transmission according to an embodiment of the present disclosure.

Referring to FIG. 13, the controller 1310 allocates the same resource for transmission of the data to different UEs and controls the control channel generator 1320 to configure the control channel based on the determination on whether to transmit multiple control channels to a UE in transmitting the scheduling information to the UE.

For the data channel transmitted to the UE, the data channel generator 1340 generates the data channel using the transmission scheme proposed in the present disclosure. The control and data channels configured in this way are transmitted to the UE by means of the transmitter 1330.

Figure 14:
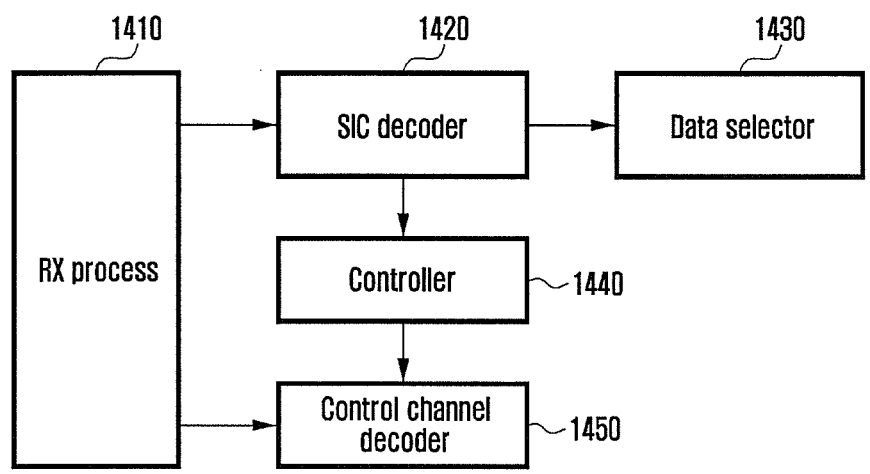
FIG. 14 is a diagram illustrating a configuration of the UE for interference cancellation transmission according to an embodiment of the present disclosure.

FIG. 14 is a diagram illustrating a configuration of the UE for interference cancellation transmission according to an embodiment of the present disclosure.

Referring to FIG. 14, the UE receives the signal from the eNB by means of the receiver 1410 and extracts the corresponding control channel and acquires the control channel information by means of the control channel receiver 1450.

The controller 1440 is capable of decoding the data channel according to the control channel processing method based on the acquired control channel information. The controller 1440 controls the interference cancellation receiver 1420 to perform demodulation and controls the data selector 1430 to determine whether the demodulated signal is the information addressed to the UE based on the control channel information and receive only the information addressed to the UE.

As described above, the MIMO transmission method and apparatus of the present disclosure is capable of mitigating interference caused by the signals transmitted to other terminals using the least information even with a legacy terminal receiver having no interference cancellation capability.

Also, the MIMO transmission method and apparatus of the present disclosure is capable of canceling interference without extra terminal complexity, thus improving MU-MIMO transmission performance.

Also, the MIMO transmission method and apparatus of the present disclosure is capable of allowing a terminal to acquire the information necessary for demodulating data channel signals transmitted to other terminals using proposed control channel information and canceling interference based on the acquired information.

Also, the MIMO transmission method and apparatus of the present disclosure is capable of performing MU-MIMO scheduling according to the channel condition of the terminals within the cell and dynamically changing interference cancellation instructions to a certain terminal.

It is to be appreciated that those skilled in the art can change or modify the embodiments without departing the technical concept of this disclosure. Accordingly, it should be understood that above-described embodiments are essentially for illustrative purposes only but not in any way for restriction thereto. Thus the scope of the disclosure should be determined by the appended claims and their legal equivalents rather than the specification, and various alterations and modifications within the definition and scope of the claims are included in the claims.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An interference cancellation method of a terminal in a mobile communication system, the method comprising:
receiving, from a base station, control channel information including an interference indicator and transport block information associated with a transport block, the transport block information includes at least one of modulation and coding scheme (MCS), new data indicator (NDI), and redundancy version (RV);
determining whether the transport block is for the terminal or other terminal based on the interference indicator;
receiving data from the base station based on the transport block information if the transport block is for the terminal; and
performing interference cancellation based on the transport block information, a first base station identifier for identifying the base station, and a first terminal identifier for identifying the terminal if the transport block is for the other terminal, wherein the first base station identifier and the first terminal identifier is received from the base station.

2. The method of claim 1, further comprising determining a second base station identifier and a second terminal identifier for identifying other base station and the other terminal,
wherein performing the interference cancellation comprises performing the interference cancellation based on the first base station and terminal identifiers and the second base station and terminal identifiers.

3. The method of claim 2, further comprising receiving channel information reference signal configuration information from the base station,
wherein the determining of the second base station and terminal identifiers comprises:
determining scheduling information allocated to the terminal on the control channel information based on the first base station and terminal identifiers; and determining the second base station and terminal identifiers based on the channel information reference signal configuration information and the scheduling information.

4. The method of claim 2, wherein performing the interference cancellation comprises:
determining an interference signal based on the second base station and terminal identifiers; and
performing self-interference cancellation based on the determined interference signal.

5. An interference cancellation support method of a base station in a mobile communication system, the method comprising:
transmitting, to a terminal, control channel information including an interference indicator and transport block information associated with a transport block, the transport block information includes at least one of modulation and coding scheme (MCS), new data indicator (NDI), and redundancy version (RV); and
transmitting data to the terminal based on the transport block information if the transport block is for the terminal,
wherein interference cancellation is performed by the terminal based on the transport block information, a first base station identifier for identifying the base station, and a first terminal identifier for identifying the terminal if the transport block is for the other terminal,
wherein the base station transmits the first base station identifier and the first terminal identifier to the terminal.

6. The method of claim 5, wherein the terminal determines a second base station identifier and a second terminal identifier for identifying the other base station and terminal and performs interference cancellation based on the first base station and terminal identifiers and the second base station and terminal identifiers.

7. The method of claim 6, further comprising transmitting channel information reference signal configuration information to the terminal,
wherein the terminal determines scheduling information allocated to the terminal on the control channel information based on the first base station and terminal identifiers and the second base station and terminal identifiers based on the channel information reference signal configuration information and the scheduling information.

8. The method of claim 6, wherein the terminal determines an interference signal based on the second base station and terminal identifiers and performs self-interference cancellation based on the determined interference signal.

9. A terminal of a mobile communication system, the terminal comprising:
a transceiver configured to transmit to and receive from a base station; and
a controller configured to control the transceiver to receive control channel information including an interference indicator and transport block information associated with a transport block from a base station, determine whether the transport block is for the terminal or other terminal based on the interference indicator, control the transceiver to receive data from the base station based on the transport block information if the transport block is for the terminal, and perform interference cancellation based on the transport block information, a first base station identifier for identifying the base station, and a first terminal identifier for identifying the terminal if the transport block is for the other terminal,
wherein the first base station identifier and the first terminal identifier is received from the base station, and
wherein the transport block information including at least one of modulation and coding scheme (MCS), new data indicator (NDI), and redundancy version (RV).

10. The terminal of claim 9, wherein the controller is configured to determine a second base station identifier and a second terminal identifier for identifying other base station and the other terminal and perform interference cancellation based on the first base station and terminal identifiers and the second base station and terminal identifiers.

11. The terminal of claim 10, wherein the controller is configured to control the transceiver to receive channel information reference signal configuration information from the base station and determine scheduling information allocated to the terminal on the control channel information based on the first base station and terminal identifiers and the second base station and terminal identifiers based on the channel information reference signal configuration information and the scheduling information.

12. The terminal of claim 10, wherein the controller is configured to determine an interference signal based on the second base station and terminal identifiers and perform self-interference cancellation based on the determined interference signal.

13. A base station of a mobile communication system, the base station comprising:
a transceiver configured to transmit signals to and receive signals from a terminal; and
a controller configured to control the transceiver to transmit to the terminal control channel information including an interference indicator and transport block information associated with a transport block, and transmit data to the terminal based on the transport block information if the transport block is for the terminal,
wherein interference cancellation is performed by the terminal based on the transport block information, a first base station identifier for identifying the base station, and a first terminal identifier for identifying the terminal if the transport block is for the other terminal,
wherein the base station transmits the first base station identifier and the first terminal identifier to the terminal, and
wherein the transport block information including at least one of modulation and coding scheme (MCS), new data indicator (NDI), and redundancy version (RV).

14. The base station of claim 13, wherein the terminal determines a second base station identifier and a second terminal identifier for identifying the other base station and terminal and performs interference cancellation based on the first base station and terminal identifiers and the second base station and terminal identifiers.

15. The base station of claim 14, wherein the controller is configured to control the transceiver to transmit channel information reference signal configuration information to the terminal,
wherein the terminal determines scheduling information allocated to the terminal on the control channel information based on the first base station and terminal identifiers and the second base station and terminal identifiers based on the channel information reference signal configuration information and the scheduling information.

16. The base station of claim 13, wherein the terminal determines an interference signal based on the second base station and terminal identifiers and performs self-interference cancellation based on the determined interference signal.

* * * * *